H. W. WILDMAN.
TRACTION AND TREAD WHEEL.
APPLICATION FILED MAY 23, 1917.
1,334,064.
Patented Mar. 16, 1920.
2 SHEETS—SHEET 1.
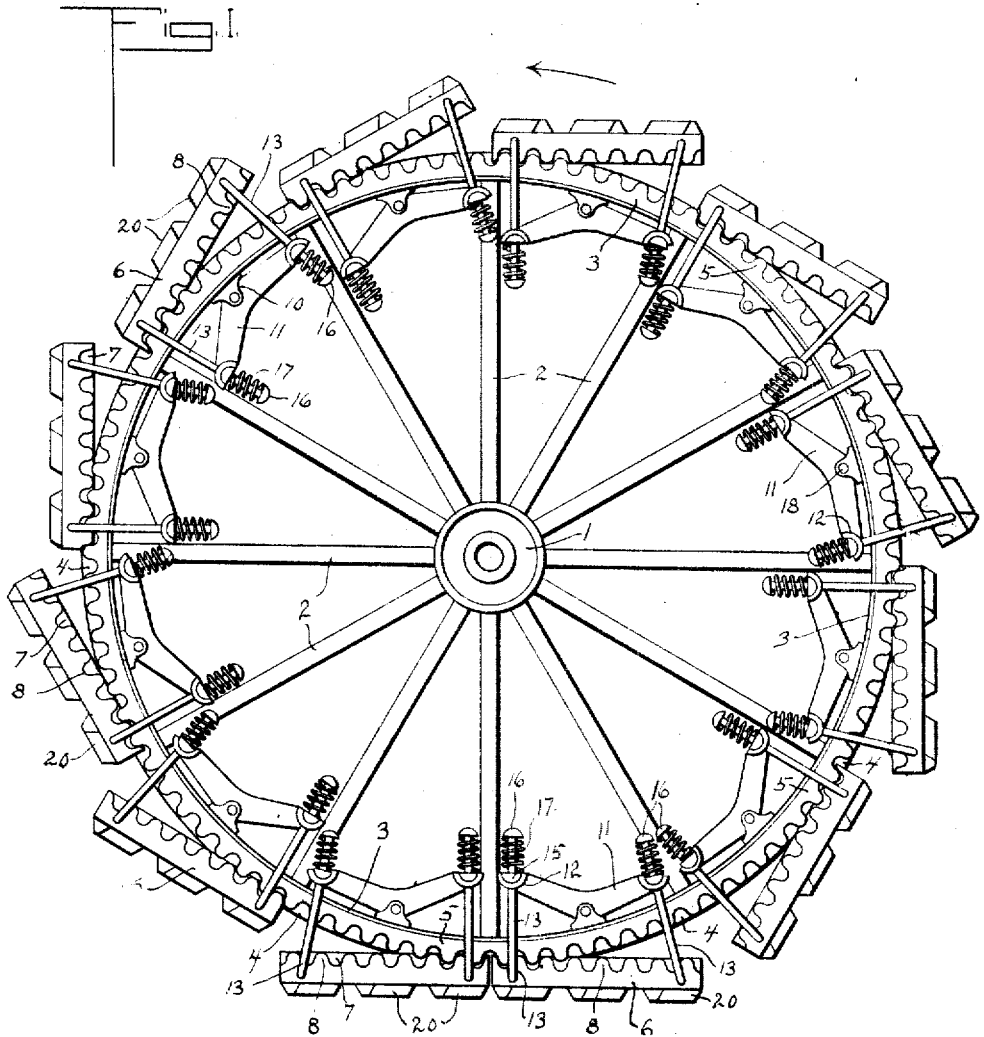
Witness
Frank W. Haskell
Inventor
Henry W. Wildman.
By Walter N. Haskell,
his Attorney

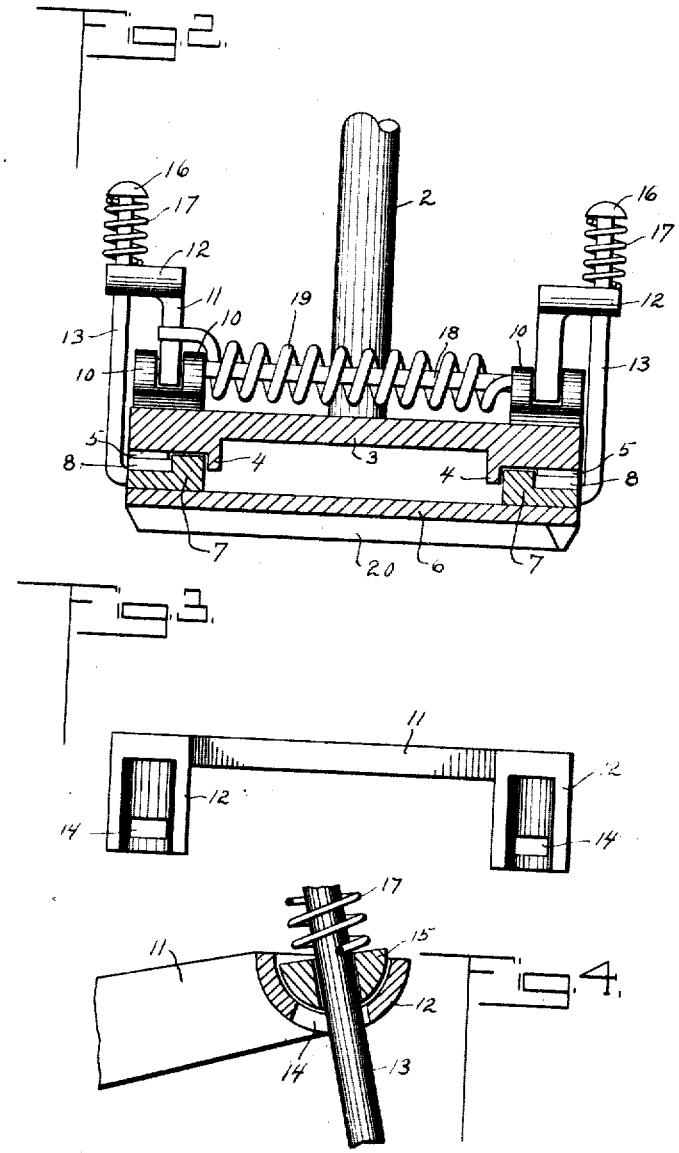

UNITED STATES PATENT OFFICE.

HENRY W. WILDMAN, OF PROPHETSTOWN, ILLINOIS.

TRACTION AND TREAD WHEEL.

1,334,064.

Specification of Letters Patent. Patented Mar. 16, 1920.

Application filed May 23, 1917. Serial No. 170,365.

*To all whom it may concern:*

Be it known that I, HENRY W. WILDMAN, a citizen of the United States, residing at Prophetstown, in the county of Whiteside and State of Illinois, have invented certain new and useful Improvements in Traction and Tread Wheels, of which the following is a specification.

My invention pertains to wheels, of that class which are intended to be employed in the hauling of heavy loads, and in operating in soils of varying consistency. It is specially designed for use on tractors, portable engines, for transporting artillery, and similar uses. Many of the wheels used about vehicles of the kind mentioned are satisfactory in traveling over solid ground, but in softer earth or in mud they are practically useless. In a soft spot or mud-hole, where the footing is insufficient, there is a tendency of the wheel to rotate without progressing, and as it continues to rotate in the same spot, it soon cuts a hole for itself in the soft material, into which it sinks farther and farther, until it is helpless. The chief purpose of my invention is to provide the wheel with a larger and firmer footing, so that the weight of the wheel and vehicle will be distributed over a greater area than is the case in a wheel of ordinary construction. To accomplish this I make use of novel mechanical parts and operations, which will more fully appear from the following specification, reference being had to the drawings accompanying the same, in which:

Figure 1 shows my invention in side elevation. Fig. 2 is a cross-section through the rim 3, at the lower edge thereof. Fig. 3 is a plan view of one of the arms 11, detached. Fig. 4 is a detail of one end of the arm 11, with the projection 12 in cross-section.

1 represents the hub of the wheel, 2 the spokes, and 3 the rim attached thereto. The edges of the rim are reinforced, or made heavier, and on the inner sides of such reinforcements are flanges 4, and spaced-apart therefrom a pair of gear rims 5. Surrounding the wheel is a plurality of shoes 6, provided on their inner faces with rails 7, which are adapted to enter the spaces between the rims 4 and gear-rims 5, and prevent the shoes from getting out of alinement with the wheels. In the operation of the wheel the rails 7 form a continuous track upon which the reinforced portions of the rim have a bearing. At their outer edges the shoes 6 are provided with gear-teeth 8, similar to the teeth of the gear-rims 5, and meshing therewith in the manner hereinafter described.

The shoes 6 have a yielding connection with the wheel by means of the following devices:—The inner face of the rim 3 is provided at regular intervals with pairs of ears 10, near each edge thereof, in each of which pairs is pivoted a rocker-arm 11, having a semi-circular projection 12 at each of its ends, through each of which projections passes a rod 13, the lower ends of said rods being bent inwardly and pivotally held in the rail 7. The projections 12 are provided with transverse slots 14, through which the rod passes, permitting a limited amount of swinging movement to said rod with relation to the member 12. Each of said projections is also provided with a rocker-block 15, having a perforation through which the rod 13 passes freely. At its upper end the rod 13 is provided with a head 16, between which and the block 15 is interposed an extensile coiled spring 17, which prevents unnecessary vibration or rattling of the rod and adjacent parts.

By reason of the construction above set forth, in the rotation of the wheel two of the shoes 6 are at all times in a horizontal position beneath the wheel, as shown in Fig. 1, the wheel thus being provided with a continuous track upon which to operate, the track being formed of a number of sections which are picked up by the wheel and carried around with it as it rotates. Referring to the two shoes at the bottom of the wheel, and assuming the wheel to be turning in the direction of the arrow, the wheel next passes over the shoe at the left, until, as it nears the opposite end thereof, such shoe assumes the position of the one shown at the right, the rods 13 and rocker-arms adjusting themselves automatically to the changed position of the shoe with relation to the wheel. In this movement the gear-teeth 8 are successively in engagement with the teeth of the gear 5, and, together with the track 7, assist in holding the shoe in alinement with the rim, even when heavy loads are supported thereon, any side-twist or detachment of the shoe being impossible. The flanges 4 also assist in holding the shoes 6 in alinement, but are not essential, as the engagement of the teeth of the gear-rims 5 with the outer faces of the rail would be sufficient even if the flanges were dispensed with.

In the rotation of the wheel it is preferable to have that end of each of the shoes which first approaches the ground in engagement with the wheel, as shown in Fig. 1, and to bring this about I make use of the following means: The pivots for the arms 11 are comprised of the ends of a pin 18, extending transversely of the rim from one pair of ears to the other, and encircling said pin is a torsion spring 18, one end of which is attached to one of the ears 10, and the other end engaged with one of the parts of the rocker-arm 11, to hold the same normally in an elevated position.

The outer faces of the shoes 6 may be provided with transverse ribs 20 or similar devices for insuring a better contact with the earth.

The shoes 6 may be formed of any suitable size, depending upon the proportions of the wheel itself, but for heavier uses would be of approximately a foot in width and the same in length.

The springs 17 are not essential to the successful operation of my invention, as the springs can be omitted, and the rods shortened and provided with heads just above the rocker-blocks 15, and the operation of the shoes would be the same. The movement of one end of the rocker-arm 11 is compensated by the movement of the other end in the opposite direction.

There has been shown and described herein the preferred embodiment of my invention, but I am aware that changes can be made in the form and arrangement of the parts thereof without departing from the spirit thereof.

What I claim as my invention, and desire to secure by Letters Patent of the United States, is:

1. A device of the class described, comprising a rim; a plurality of tread sections adapted to be held in alinement therewith; a plurality of rocker-arms mounted on the inner face of said rim; and rods connecting the ends of said rocker arms with said tread sections.

2. In a device of the class described, a rim; a plurality of tread sections adapted to be held in alinement therewith; rocker-arms mounted on said rims, provided with semi-circular projections; rocker-blocks in said projections; and spring-controlled rods passing through said rocker-blocks and pivotally connected with said tread sections.

3. In a device of the class described; a rim; a plurality of tread-sections adapted to be held in alinement therewith; a plurality of rocker-arms mounted on said rim; rods connecting said rocker-arms with said tread sections; and means for holding said tread sections with that end which first engages the ground in engagement with said rim.

In testimony whereof I affix my signature in the presence of two witnesses.

HENRY W. WILDMAN.

Witnesses:
W. N. HASKELL,
GRANT WILDMAN.